United States Patent
Boyd et al.

(10) Patent No.: US 7,967,096 B2
(45) Date of Patent: Jun. 28, 2011

(54) LEAN STEERING TRUCK WITH A TORSION SPRING ASSEMBLY

(75) Inventors: Tom Boyd, San Diego, CA (US); Rasyad Chung, Berkeley, CA (US); Greg Grosset, Boulevard, CA (US); William Lofft, San Diego, CA (US); Amish Parashar, Campbell, CA (US)

(73) Assignee: ZuumCraft, Inc., San Diego, CA (US)

( * ) Notice: Subject to any disclaimer, the term of this patent is extended or adjusted under 35 U.S.C. 154(b) by 17 days.

(21) Appl. No.: 12/406,829

(22) Filed: Mar. 18, 2009

(65) Prior Publication Data

US 2010/0072722 A1    Mar. 25, 2010

Related U.S. Application Data

(60) Provisional application No. 61/038,362, filed on Mar. 20, 2008, provisional application No. 61/038,364, filed on Mar. 20, 2008.

(51) Int. Cl.
 *B62D 61/06* (2006.01)
(52) U.S. Cl. .................................. 180/210; 280/87.042
(58) Field of Classification Search .................. 180/210; 280/11.27, 11.28, 87.03, 87.041, 87.042, 280/87.043, 81.6, 124.107, 124.116, 124.166, 280/124.103, 124.111, 124.137, 124.149, 280/124.152
See application file for complete search history.

(56) References Cited

U.S. PATENT DOCUMENTS

| | | | |
|---|---|---|---|
| 3,776,353 A | 12/1973 | Roth | |
| 3,811,255 A | 5/1974 | Ferguson | |
| 4,087,106 A * | 5/1978 | Winchell | 280/14.28 |
| 4,152,001 A | 5/1979 | Christianson | |
| 4,198,072 A | 4/1980 | Hopkins | |
| 4,456,277 A | 6/1984 | Carpenter | |
| 4,546,997 A | 10/1985 | Smyers | |
| 4,582,157 A | 4/1986 | Watanabe | |
| 4,887,829 A | 12/1989 | Curtis | |
| 5,048,632 A | 9/1991 | Battel | |
| 5,415,427 A | 5/1995 | Sommerer et al. | |
| 5,762,351 A | 6/1998 | SooHoo | |
| 5,765,846 A | 6/1998 | Braun | |
| 5,918,692 A | 7/1999 | Sekita et al. | |
| 6,062,581 A | 5/2000 | Stites | |
| 6,142,493 A * | 11/2000 | Wang et al. | 280/87.041 |
| 6,158,752 A * | 12/2000 | Kay | 280/87.042 |
| 6,193,249 B1 * | 2/2001 | Buscaglia | 280/87.042 |
| 6,227,555 B1 * | 5/2001 | Wang et al. | 280/87.042 |
| 6,250,649 B1 | 6/2001 | Braun | |
| 6,276,480 B1 | 8/2001 | Aregger | |

(Continued)

FOREIGN PATENT DOCUMENTS

EP    0933103    8/1999

(Continued)

OTHER PUBLICATIONS

U.S. Appl. No. 10/577,692, filed Jul. 7, 2008, Culbreth.

(Continued)

*Primary Examiner* — Faye M. Fleming
*Assistant Examiner* — Joseph Rocca
(74) *Attorney, Agent, or Firm* — Procopio, Cory, Hargreaves & Savitch LLP

(57) ABSTRACT

A mechanical assembly which enables multi-track vehicles to lean into turns and return to a neutral position thereafter.

5 Claims, 5 Drawing Sheets

U.S. PATENT DOCUMENTS

| | | |
|---|---|---|
| 6,328,125 B1 | 12/2001 | Van Den Brink et al. |
| 6,402,174 B1 | 6/2002 | Maurer |
| 6,419,248 B1 * | 7/2002 | Kay .......................... 280/87.042 |
| 6,520,517 B1 * | 2/2003 | Chung et al. .............. 280/87.042 |
| 6,863,288 B2 | 3/2005 | Van Den Brink et al. |
| 6,886,842 B2 | 5/2005 | Vey et al. |
| 7,093,842 B2 | 8/2006 | Chmelar |
| 7,097,187 B2 | 8/2006 | Walters et al. |
| 7,438,303 B2 * | 10/2008 | Cole ......................... 280/87.042 |
| 7,487,985 B1 | 2/2009 | Mighell |
| 7,591,337 B2 | 9/2009 | Suhre |
| 7,647,999 B2 | 1/2010 | Geiser |
| 7,802,800 B2 | 9/2010 | Melcher |
| 2007/0187164 A1 * | 8/2007 | Yang et al. .................... 180/209 |

FOREIGN PATENT DOCUMENTS

| | | |
|---|---|---|
| EP | 1407918 A2 | 2/2004 |
| EP | 1481881 B1 | 1/2007 |
| EP | 1738947 A2 | 1/2007 |

OTHER PUBLICATIONS

International Search Report and Written Opinion for PCT/US2009/037708 issued Oct. 30, 2009, 7 pages.

* cited by examiner

LEAN STEERING TRUCK WITH A TORSION SPRING ASSEMBLY

RELATED APPLICATIONS

This application claims the benefit of U.S. Provisional Patent Application Ser. No. 61/038,362, filed Mar. 20, 2008, entitled "Lean Steering Truck With A Torsion Spring Assembly" and claims the benefit of U.S. Provisional Patent Application Ser. No. 61/038,364, filed Mar. 20, 2008, entitled "Leaning Three Wheeled Personal Electric Vehicle", which are hereby incorporated by reference in their entirety.

FIELD OF THE INVENTION

This invention relates to mechanisms which interconnect a set of wheels of leaning vehicles used primarily for powered personal transportation. Embodiments described below is in the class of mechanical assemblies which enable vehicles, such as three wheeled scooters and four wheeled automobiles, to lean inwards into banks, curves or turns.

BACKGROUND OF THE INVENTION

This invention relates to mechanical assemblies which enable vehicles of greater than one track to lean, generally towards the center point of a turning radius. Within the set of prior art the following subsets are known:

Those which employ electromechanical systems to gauge turn or lean and proportionally actuate devices to act upon the vehicle frame or wheels, such as U.S. Pat. No. 5,765,846. These suffer from complexity derived from the necessary use of control algorithms, signal processing, or both.

A subset of the established art includes hydraulically actuated leaning devices, such as U.S. Pat. No. 4,546,997. The use of heavy hydraulic fluid systems and associated hardware in complex closed loop systems significantly increases the overall weight of leaning vehicles as well as necessitates the use of sensor systems in order to measure vehicle frame lean and act upon the hydraulic system in order to act or counteract the vehicle roll.

In another subset of the prior art mechanical linkages are used to allow for vehicle frame lean in relationship to the wheels and road surface, such as U.S. Pat. No. 4,087,106. These make no provision for the restoration to a neutral vehicle attitude upon the completion of turning or handling maneuvers. Further, the designs which rely on the rider or driver to restore the vehicle to a neutral position cannot be used in embodiments which are relatively large or heavy compared to the rider.

The herein described embodiments overcome various combinations of the significant limitations of the prior art.

SUMMARY OF THE INVENTION

In one embodiment, through the use of a mechanical assembly, rigidly connected to a vehicle frame, containing a torsion spring element, a vehicles wheels remain in contact with a road surface even in banking, curved, or extreme handling situations. Furthermore, the herein described assembly allows for vastly improved vehicle handling as the center of gravity of the vehicle and riders remain in closer alignment, and generally normal to the cabin, seat, or riding platform, of a vehicle, particularly in comparison to four wheeled vehicles containing rigid transverse axles. A torsion spring is used to provide a restorative force which acts upon the vehicle during a leaning maneuver thereby accomplishing a neutral and generally horizontal vehicle orientation after completion of a lean steering. Mechanical linkages, made to the vehicle frame, allow for a direct relationship between vehicle lean angle, tilt, and steering angle thereby enabling rear steering, the replacement of front wheel manually initiated steering with front wheel lean steering, or both.

DETAILED DESCRIPTION OF THE DRAWINGS/DESCRIPTION OF A PREFERRED EMBODIMENT

The following detailed description is directed to certain specific embodiments of the invention. However, the invention can be embodied in a multitude of different systems and methods. In this description, reference is made to the drawings wherein like parts are designated with like numerals throughout.

Figure 1:
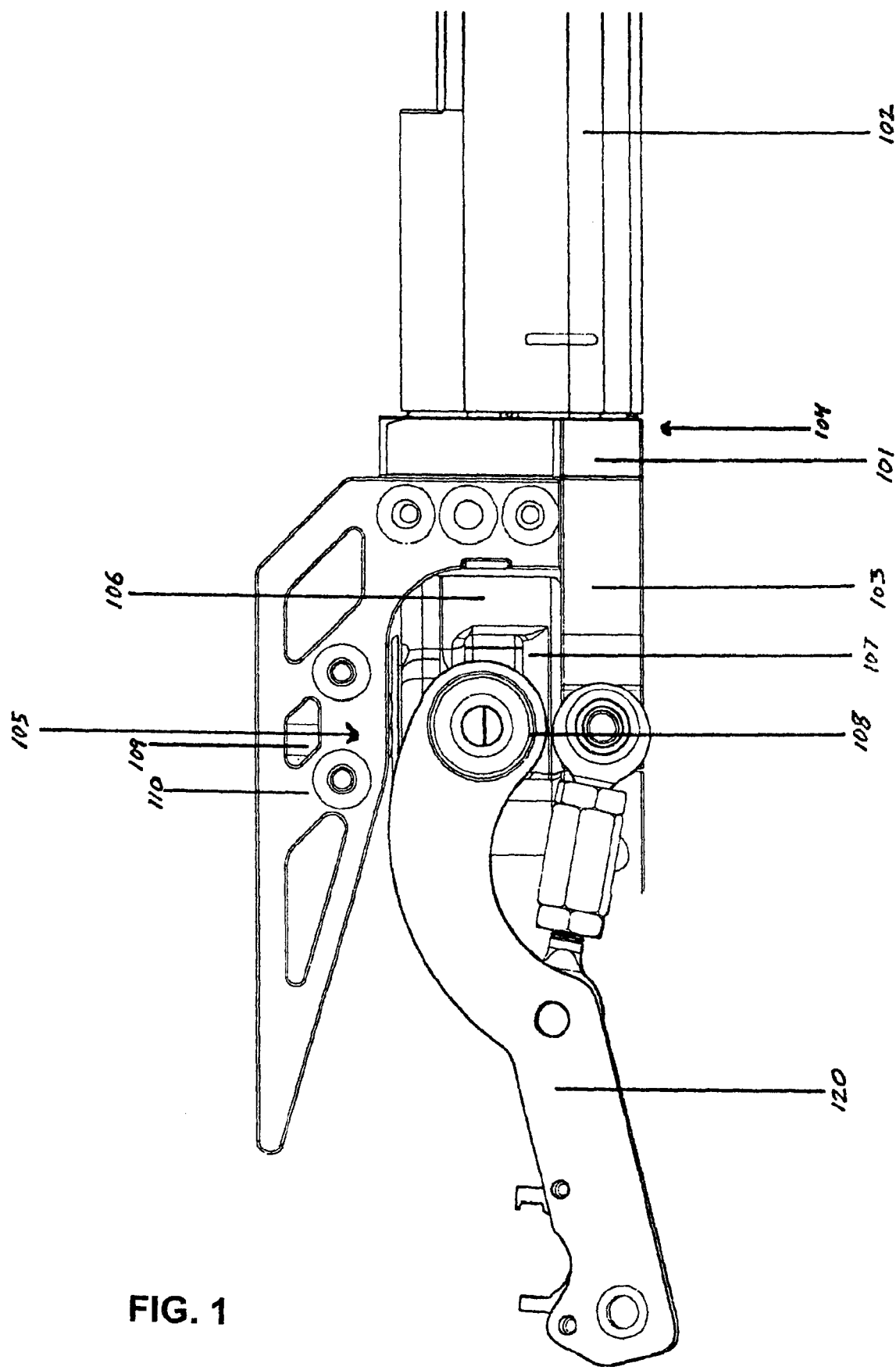
FIG. 1 is an external side view of a preferred embodiment of a lean steering truck.

As shown in FIG. 1 a vertical plate 101 is attached to the vehicle frame 102 or other vehicle structure in a rigid manner. The vertical plate 101 is further secured to a torsion hanger base plate 103, by the use of through bolts 104. Other forms of an attachment plate may also be used to attach the truck to a vehicle. The torsion hanger base plate 103 may be constructed of two pieces allowing for a clamping mechanism to secure the stationary elements of an internal spring assembly. Atop the torsion hanger base plate 103 and below torsion hanger top plate 105 lies a torsion hanger housing 106. On the vertical cylindrical surface of the torsion hanger housing 106 protrude a pair of diametrically opposed swing arm bearing support structures 107 which contact the inner race of the swing arm bearings 108. The outer race of the swing arm bearings 108 contact swing arms which accept the vehicle wheels. Pivot bolt 109 passes through the torsion hanger base plate 103, torsion hanger housing 106, and top plate 105 in order to secure the assembly. Further, pivot bolt 109 serves as the vertical axis of rotation of the assembly. Top plate 105 is held, unable to rotate, by means of supporting structure 110. In this manner the torsion hanger housing 106 is able to move in one axis of rotation about the pivot bolt 109 while the top plate 105 and torsion hanger base plate 103 are held rigid in relation to the vehicle frame 102.

Figure 2:
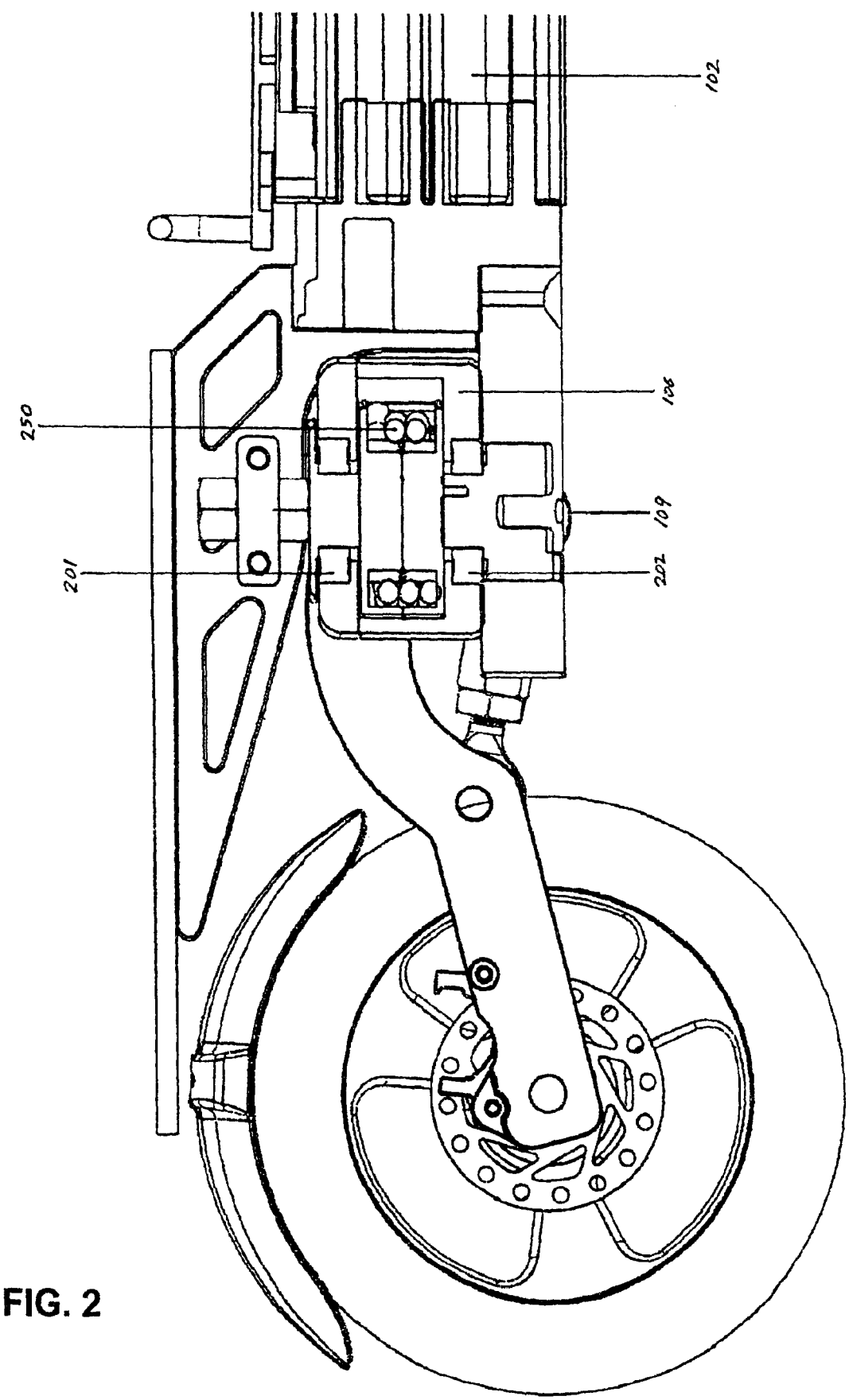
FIG. 2 is a cross sectional side view of the lean steering truck of FIG. 1.

FIG. 2 is a cross sectional view of the lean steering truck of FIG. 1. The torsion hanger housing 106 freely rotates in one axis of rotation about pivot bolt 109 by way of upper 201 and lower 202 torsion hanger bearings. Torsion spring 250, shown in cross section, is in a maximum state of relaxation when the swing arm bearings are normal to the longitudinal axis of the vehicle, a condition which allows travel along a line. As in the case of vehicle lean, the torsion spring 250 is compressed, causing one arm of the torsion spring 250 to come into contact with an adjustable strike plate, as the torsion hanger housing 106 rotates in proportion to the amount of lean experienced by the vehicle frame 102 and in response to the normal reactionary force experienced at the vehicle wheels. Torsion spring 250 is able to be set to a prescribed amount of pre-compression and an adjustable elimination of free play in the torsion spring 250 assembly. As the torsion hanger housing 106 and the swing arm bearings 108 rotate the vehicle frame 102 and thereby the vehicle is caused to turn in proportion to the amount of and in the same direction as lean, in the case of the herein described mechanism being applied between the rear wheels of a forward traveling vehicle. The torsions spring, the torsion hanger housing and the related elements which provide the torsional restorative force between the vehicle and the swing arm bearings form the torsion assembly. In an alternative embodiment the torsion assembly includes a material capable of producing torsional restorative force, such as a polyurethane bushing or other elastomeric material in place of the steel alloy torsion spring 250. In an alternative embodiment, the torsion spring 250 is held rigidly, enclosed by a spring housing chamber, and interconnected to a support structure which contacts the inner race of the lower torsion hanger bearing 202 and is further secured to the torsion hanger base plate 103. The top plate 105 is interconnected to the inner race of upper torsion hanger bearing 201 and further to the above described, relatively stationary, assembly by means of pivot bolt 109. In this manner, the torsion spring 250, is nominally in a stationary position relative to a point on the vehicle's frame 102, while the torsion hanger housing 106 and thereby the swing arm bearings 108 and thereby the associated wheels of the vehicle rotate about the pivot bolt 109.

Figure 3:
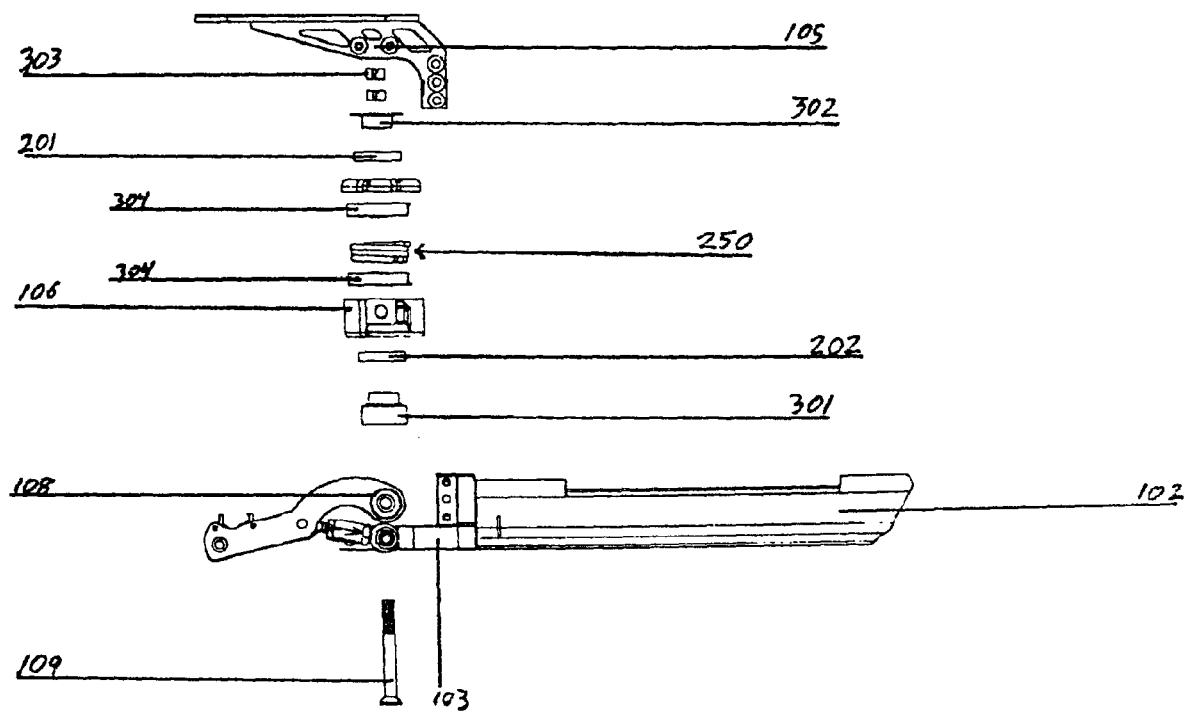
FIG. 3 is an exploded view of the lean steering truck of FIG. 1.

FIG. 3, an exploded side view of the lean steering truck depicted in FIGS. 1 and 2, The pivot bolt 109 pass through torsion hanger base plate 103 and further passes through the torsion hanger housing 106, a lower torsion spring guide 301, the torsion spring 250 or polymer bushing, an upper torsion spring guide 302, and the top plate 105 to be secured by a pivot nut 303. Further the upper 201 and lower 202 torsion hanger bearings, also secured by pivot bolt 109, and located both above and below the torsion spring, permit the transfer of co-axial forces onto both the top plate 105 as well as the torsion hanger base plate 103. Through either one or a plurality of adjustable spring strike plates 304, adjusted using strike plate set screws 305, 306, the torsion spring 250 is able to to be set to a prescribed amount of pre-compression. Alternatively one or a plurality of set screws are used, in direct contact with the torsion spring 250, to adjust the pre-compression or initial deflection of the said spring. In this manner the torsion hanger housing 106 assembly is adjusted to a neutral position, so as the swing arm bearings 108 are normal to the vehicle frame 102, thereby eliminating the effect of manufacturing, torsion spring 250, and other variability present within the integrated assembly. In an alternative envisioned embodiment the torsion hanger base plate 103 may be loosened around a structure in contact with the inner race of the lower torsion hanger bearing 202 and also the torsion spring 250 to adjust the assembly to a neutral position prior to firmly securing the torsion hanger base plate 103 about this said structure. Alternatively, other tension adjustment or setting mechanisms can be used.

Figure 4:
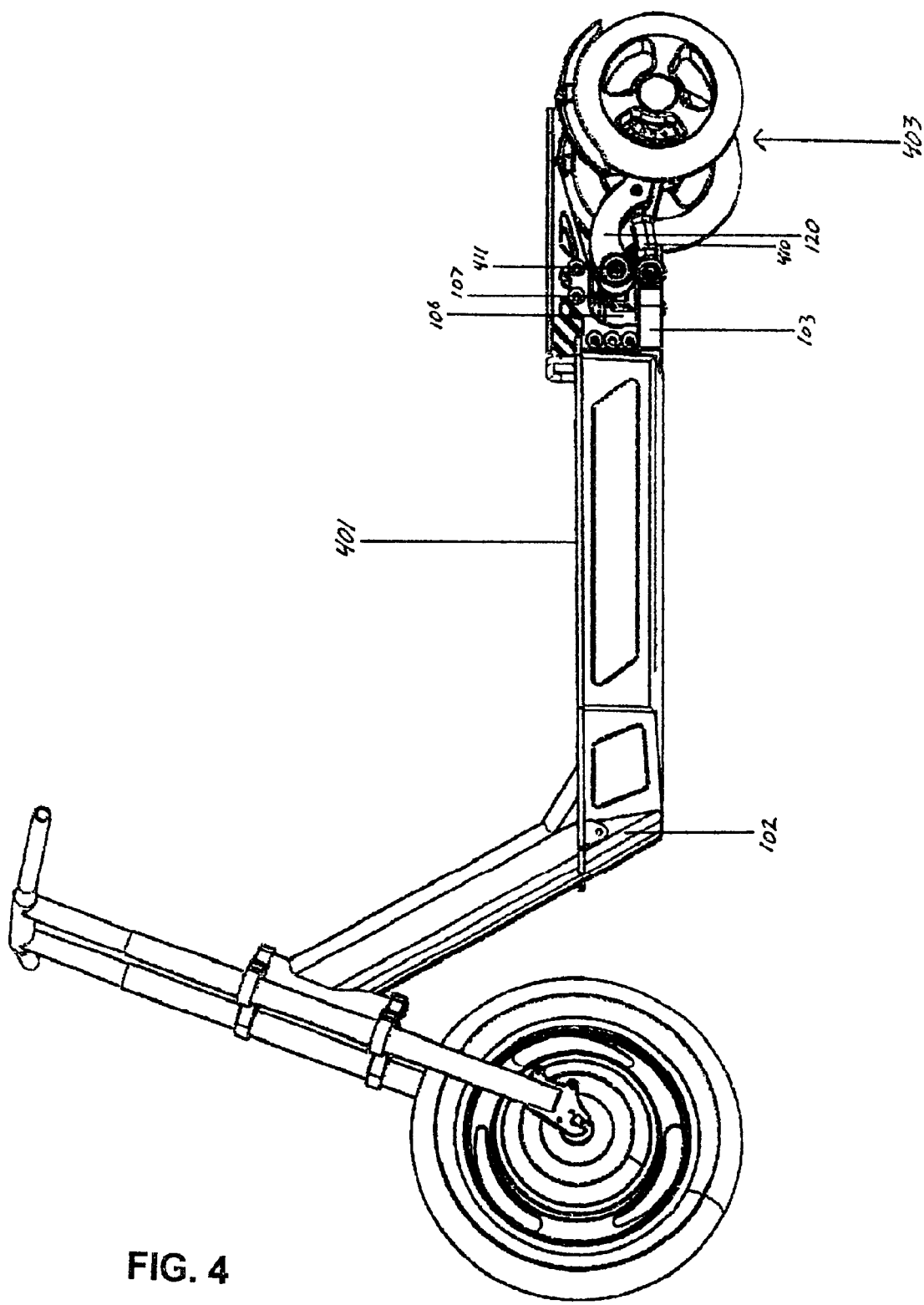
FIG. 4 is a side view of a vehicle including the lean steering truck of FIG. 1.
Figure 5:
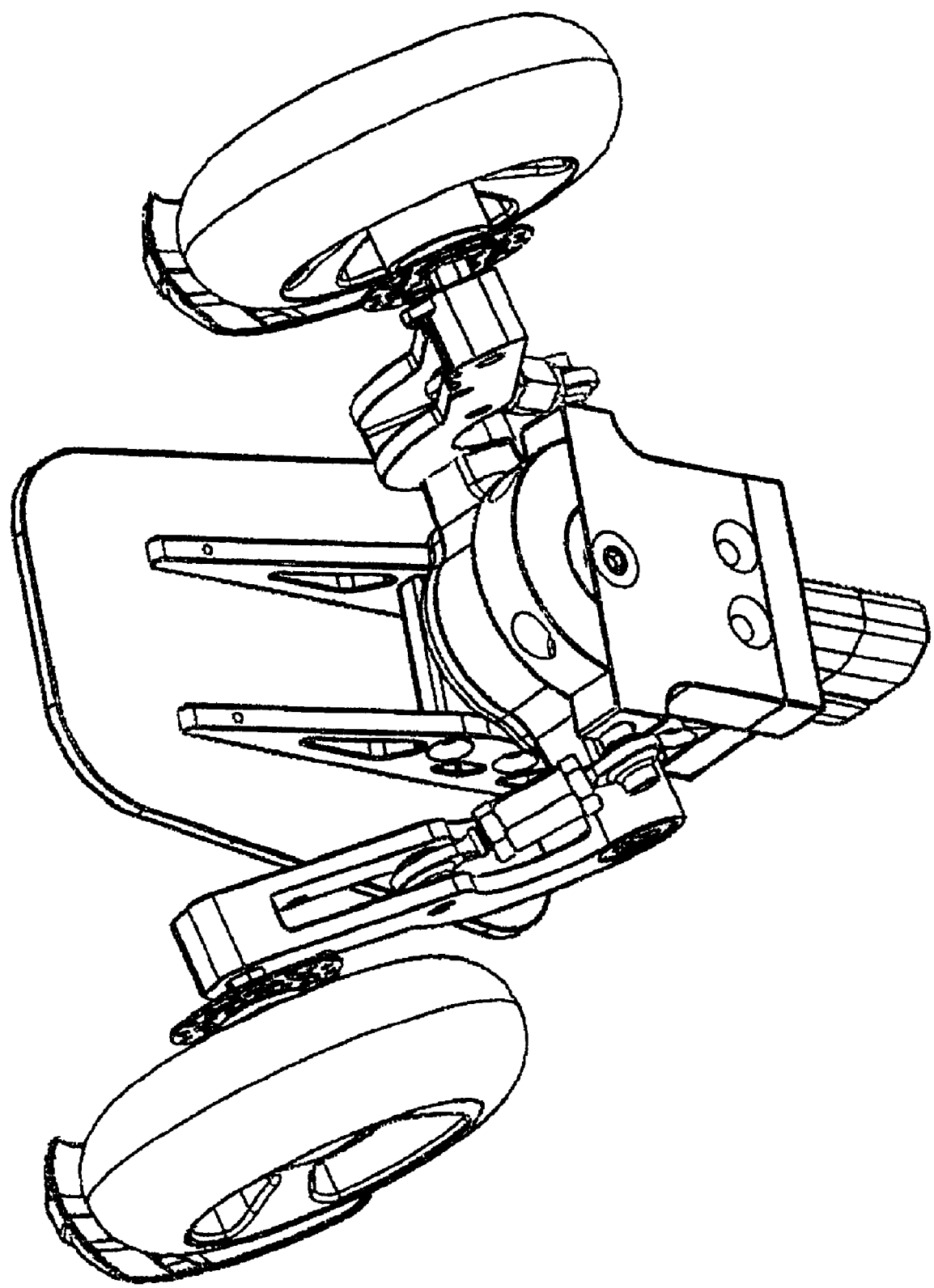
FIG. 5 is a bottom perspective view of the rear portion of the vehicle of FIG. 4.

As shown in FIG. 4, a side view of an embodiment, the vehicle frame 102 is shown in a neutral position with the swing arm bearing support structures 107 normal to the longitudinal axis of the vehicle frame 102. By a rider exerting force on any point other than those along the longitudinal axis of the vehicle, such as on either the proximal or distal edge of main platform 401, the frame is said to lean and the torsion hanger housing 106 and thereby swing arms 120 and wheels 403 rotate in direct relation to the amount and direction of lean as is shown in FIG. 5. The torsion spring 250, compressed in relation to the lean amount, acts to restore the vehicle frame 102 to a neutral, in this figure upright, position. Further a pair of control arms 410, placed in parallel to, and directly below, the swing arms 402 limit the rotation of the swing arms 120 and connect the fixed torsion hanger base plate 103 to the swing arms 120. These control arms 410 are rotationally connected to the torsion hanger base plate 103 and to the swing arms 402 by Heim or ball joints placed at opposing ends of the control arms 410. The swing arms 120 experience two axes of rotation, the first about the pivot bolt 109 and the second about the swing arm bearing bolt 411. The control arms 410 in concert with the torsion hanger housing 106 and the swing arms 120 cause the rear wheels 403 to tilt and rotate into a turn.

In an alternative embodiment a torsion spring 250 assembly is used both before and aft of the rider or driver. In such a manner four swing arms 120 are employed, one for each wheel 403, which are placed to nominally form the vertices of a rectangle. The resultant four wheeled vehicle is capable, powered by four electrical in-hub motors or other distributed mode of power, of lean steering into curve or turns and self righting to a neutral position upon completion of said handling maneuver. The combination of four wheeled lean steering can be complimented by above described handlebar manipulated manual front wheel steering by a more vertical neutral positioning of the front swing arms 120.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent exemplary embodiments of the invention and are therefore representative of the subject matter which is broadly contemplated by the present invention. It is further understood that the scope of the present invention fully encompasses other embodiments and that the scope of the present invention is accordingly limited by nothing other than the appended claims.

The invention claimed is:
1. A lean steering truck comprising:
an attachment plate;
a torsion assembly including a torsion hanger housing rotatably coupled with the attachment plate and providing resistive force against rotation in a first plane from a defined neutral position;
a first swing arm rotatably coupled to the torsion assembly such that the first swing arm is rotatable in a plane other than the first plane of rotation of the torsion assembly;
a first control arm coupled to the first swing arm assembly at a location on the first swing arm distal to a point at which the first swing arm is coupled to the torsion assembly;
a second swing arm rotatably coupled to the torsion assembly such that the second swing arm is rotatable in a plane other than the first plane of rotation of the torsion spring assembly; and
a second control arm coupled to the second swing arm assembly at a location on the second swing arm distal to a point at which the second swing arm is coupled to the torsion assembly.
2. The lean steering truck of claim 1 wherein the torsion assembly comprises a torsion spring.
3. The lean steering truck of claim 1 wherein the torsion assembly further comprises a tension adjustment mechanism.

4. The lean steering truck of claim 3 wherein the tension adjustment mechanism comprises one or more set screws.

5. A lean steering truck for use with a vehicle comprising:
- a torsion assembly including a torsion hanger housing rotatably coupled with the vehicle and providing resistive force against rotation in a first plane from a defined neutral position;
- a first swing arm rotatably coupled to the torsion assembly such that the first swing arm is rotatable in a plane other than the first plane of rotation of the torsion assembly;
- a first control arm coupled to the first swing arm assembly at a location on the first swing arm distal to a point at which the first swing arm is coupled to the torsion assembly;
- a second swing arm rotatably coupled to the torsion assembly such that the second swing arm is rotatable in a plane other than the first plane of rotation of the torsion spring assembly; and
- a second control arm coupled to the second swing arm assembly at a location on the second swing arm distal to a point at which the second swing arm is coupled to the torsion assembly.

* * * * *